Sept. 3, 1957     C. R. BONNELL     2,805,373
SERVOMOTOR SYSTEM
Filed June 8, 1955

INVENTOR.
CHARLES ROBERT BONNELL
BY
Williamson, Schroeder, Adams, & Meyers
ATTORNEYS United States Patent Office
2,805,373
Patented Sept. 3, 1957

2,805,373

SERVOMOTOR SYSTEM

Charles Robert Bonnell, Minneapolis, Minn., assignor to Cedar Engineering, Inc., Minneapolis, Minn., a corporation of Minnesota Application June 8, 1955, Serial No. 513,991

6 Claims. (Cl. 318—28)

This invention relates to a transducer for producing rotary power in response to a sensed actuating force.

It has been common practice in the past, in the amplification of sensed mechanical forces or movements, to cause the sensed force to create or vary an electrical signal, to then amplify the electrical signal by such means as an electronic amplifier and to then apply the amplified electric signal to suitable apparatus such as a servomotor designed to reconvert the amplified electric signal to mechanical motion such as rotation. The apparatus and circuitry necessary to accomplish these functions is both complicated and expensive, and is in need of continued service and maintenance. Although such apparatus may be fairly reliable there are many components to amplify these signals that could easily fail to operate. An example of such apparatus is that which has been used in the past to change and amplify the mechanical output of the gyroscope in aircraft for the purpose of operating the aircraft control surfaces. Such apparatus usually employs electronic or magnetic amplifiers which are used to amplify the electric signals produced by the mechanical output motion of the gyroscope. The output of the amplifiers is then used in various ways to control the aircraft control surfaces. The electronic amplifiers necessary to the performance of these required functions are not only expensive and complicated, but are of substantial weight, which is highly important in aircraft equipment.

An object of my invention is to provide a new and improved transducer of extreme reliability and of relatively simple construction and operation for producing rotary power in response to a sensed force.

Another object of my invention is to provide a novel transducer for producing a torque in response to a rectilinear component of a sensed force, and for greatly amplifying the torque with respect to the magnitude of such a rectilinear component.

Still another object of my invention is the provision of a new transducer which, upon the sensing of a rectilinear force, will produce a torque and power output of relatively high magnitude and which after the sensed rectilinear force is removed, will immediately return to a condition of no torque or power output.

A further object of my invention is the provision of a novel transducer including a pair of electric motors arranged for exerting opposed torques which are unbalanced by forced relative axial shifting of the stators and rotors to cause rotation of a shaft, and which torques are rebalanced when the force tending to axially shift the rotors and stators is removed.

A still further object of my invention is the provision of a transducer including a pair of interconnected electric motors arranged to exert opposed torques and arranged to normally urge the relatively shiftable stators and rotors to centered positions to balance their opposed torques wherein the opposed torques are balanced one against the other and form an axially shifted position of the rotors and stators one relative to the other, wherein the opposed torques are unbalanced and wherein rotation of the rotors is produced.

Still a further object of my invention is the provision of a transducer for producing rotary power output in response to a sensed force, and wherein the increment of rotation of the output drive shaft bears a predetermined relation to the magnitude of the force input to be sensed.

Still another object of my invention is to provide a transducer, which, in response to a sensed force, produces incremental rotation of a driven member from a rotational centered position, and which, when the sensed force is removed, returns the driven member to the rotational centered position whereupon rotation thereof will cease.

These and other objects and advantages of my invention will more fully appear from the following description made in connection with the accompanying drawings wherein like reference characters refer to the same or similar parts throughout the several views and in which.

Figure 1:
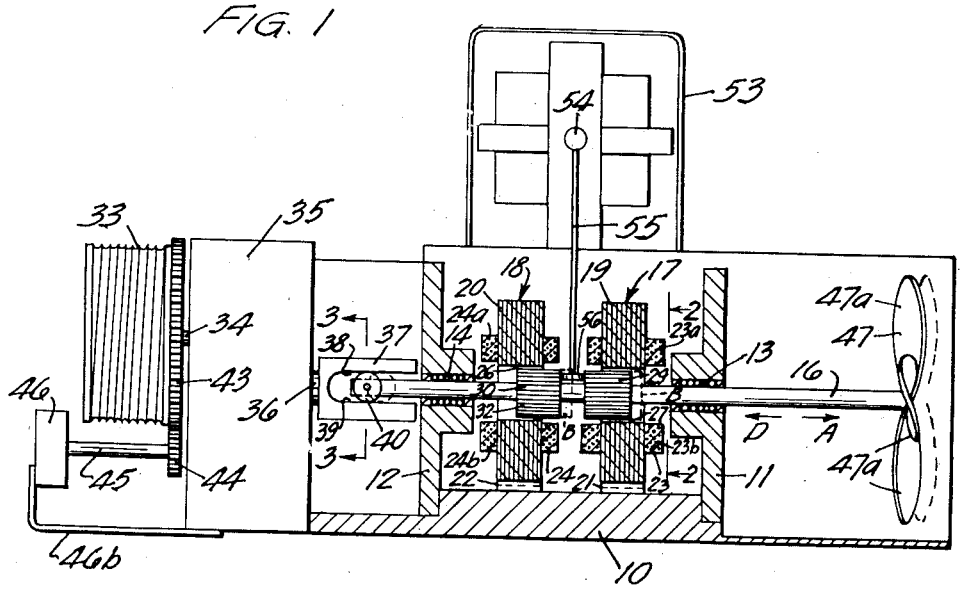
Fig. 1 is a sectional elevation view of one embodiment of the invention.

The disclosed embodiment of the invention includes a frame 10 having upstanding bearing mountings 11 and 12 secured thereto in spaced apart relation. Bearings 13 and 14 are provided in the upstanding bearing mounts 11 and 12 respectively and carry a rotary shaft 16. Bearings 13 and 14 are of a conventional type permitting both rotation and axially directed displacement of shaft 16.

The disclosed embodiment of the invention includes a pair of simple single phase induction type electric motors indicated in general by numerals 17 and 18 and are mounted in axial alignment on the frame 10 and constructed and arranged to exert oppositely directed torques on the shaft or driven member 16. Motors 17 and 18 have field producing means which include field members 19 and 20 and which are of a conventional laminated iron type of construction and which are suitably secured to and mounted on frame 10 by brackets 21 and 22. Field members 19 and 20 have field coils 23 and 24 respectively mounted thereon for inducing magnetic fields therein when energized. In the form shown, field coils 23 and 24 are respectively formed of separate portions 23a and 23b, 24a and 24b which are disposed in spaced relation with each other on the respective field members 19 and 20. Field members 19 and 20 also have pole faces 25 and 26 which are arcuately curved about the rotation axis of shaft or driven member 16 which extends centrally between the pole faces of each of the field members 19 and 20. Field members 19 and 20 are also provided with shading coils 27 and 28 respectively disposed adjacent the pole faces 25 and 26 thereof for effecting rotating or torque-producing fields at the pole faces when the field coils 23 and 24 are connected to alternating current.

Motors 17 and 18 are provided with armature means which include armatures 29 and 30 which are of a conventional type for single phase induction motors and which are affixed to the driven member 16. Armatures 29 and 30 of motors 17 and 18 respectively are spaced from each other in an axial direction a distance which is substantially different than the spacing of field members 19 and 20 from each other. The outer peripheral surfaces 31 and 32 of armatures 29 and 30 are respectively spaced in opposed relation from the pole faces 25 and 26 of the corresponding field members 19 and 20 with an air gap therebetween. Because armatures 29 and 30 are closer together than are the field members 19 and 20, only portions of the armature peripheral surfaces 31 and 32 are normally in directly opposed relation or overlapped with the corresponding pole faces 25 and 26. If shaft 16 and armatures 29 and 30 are shifted in an axial direction, such as into dotted position B, the overlap of armatures 29 and 30 with their respective field members 19 and 20 is changed, or the portion or area of the peripheral surface 31 of armature 29 which is in directly opposed relation with the respective pole face 25 is increased and is greater than the portion or area of the peripheral surface 32 of armature 30 which is in directly opposed relation with the pole face 26 of field member 20.

Means are provided for transmitting the rotary motion and torque from shaft 16. In the form shown, such means include a cable or line winding drum 33 which is secured to a spindle 34 for rotation therewith. Spindle 34 is connected into a speed changing gear box 35 which may be of any suitable type and is connected thereby to the rotary input shaft 36. Shaft 36 may be connected by any suitable means to the rotary shaft 16 and in the form shown, shaft 36 is provided with a bifurcated stud 37 extending axially thereof having a pair of flat and smooth interior surfaces 38 and 39 which are disposed equal distances from and on opposite sides of the rotation axis of shaft 16. Shaft 16 extends between the surfaces 38 and 39 of the bifurcated stud 37 and is provided with a pair of bearing wheels 40 and 41 which are journalled thereon for rotation on an axis extending transversely of the rotation axis of shaft 16. Bearing wheels may be suitably mounted on a transverse axle shaft 42 extending through a suitable aperture in shaft 16.

Means are provided for feeding power from the output of the transducer back into the transducer for rebalancing the torques exerted by the separate armatures 29 and 30 after the same have been unbalanced due to axial shifting thereof relative to field members 17 and 18. In the form shown, such means include a rotary potentiometer 46 the ends of which are connected to the opposite ends of the series-connected field coils 23 and 24 and through a single current limiting resistor 50 to power terminals 48 and 49 which may be energized through suitable switch means (not shown), and the center tap 46a which is connected to the common connection between the series-connected field coils 23 and 24. As shown in Fig. 1, potentiometer 46 is affixed to the housing of gear box 35 by means of a bracket 46b. The rotary center tap shaft 45 of potentiometer 46 has a relatively small gear 44 affixed thereon which is meshed with and driven from a large rotary gear 43 which is affixed to shaft 34. Therefore, with turning of armatures 29 and 30 and driven member 16, the center tap 46a will be shifted to different position to thereby increase the excitation of one of the field coils 23 and 24 and decrease the excitation of the other.

Another control potentiometer 51 is connected at its opposite ends to the opposite ends of the field coils 23 and 24 and is connected through its center tap 51a and wire 52 to the common connection between field coils 23 and 24. The center tap 51a of potentiometer 51 may be controlled by any suitable means such as manual operation to vary when shifted, the relative excitations of field coils 23 and 24.

Means are also provided for damping the movement of shaft 16 and armatures 29 and 30. In the form shown, such means include a propeller or fan 46 which is affixed to a shaft 16 for rotation therewith and for axial shifting therewith. The blades 47a are formed with a pitch so as to restrict both rotation and axial displacement of shaft 16 and armatures 29 and 30.

Means are also provided for orienting or axially displacing the rotary shaft 16 and the armatures 29 and 30 relative to the field members 19 and 20. In the form shown, such means include a simple gyroscope 53 of a type conventional to aircraft control and having an output shaft 54 mounted for rotatable oscillation. An elongated arm or output lever 55 is affixed to the shaft 54 and depends therefrom to shaft 16. Rod 55 is connected to shaft 16 by suitable means such as a bearing 56 on the lower end thereof which is connected to shaft 16 to permit rotation of shaft 16 with respect to bearing 56 and to permit bearing 56 to shift shaft 16 in either axial direction.

*Operation*

When power is supplied from terminals 48 and 49 to the field coils 23 and 24 torque-producing magnetic fields will be effected at the pole faces 25 and 26 of field member 19 and 20 respectively. The magnetic fields will, due to shading coils 27 and 28, rotate in opposite directions with respect to the rotation axis of the armatures 29 and 30 and shaft 16. If the excitations of the field coils 23 and 24 are substantially equal, the strength of the magnetic fields at the pole faces 25 and 26 will be substantially equal and axially directed forces will be exerted by the fields on the armatures 29 and 30 tending to bring the respective armatures 29 and 30 into alignment with their respective field members 19 and 20. Because of the differences in axial spacing of the armatures and the field members, armatures 29 and 30 will normally remain in the full line position shown in Fig. 1. The oppositely rotating fields of field members 19 and 20 will cause oppositely directed torques to be developed in armatures 29 and 30 and to be exerted thereby against shaft 16. The opposed torques will be substantially equal and balanced in the centered position shown and the shaft 16 will remain stationary and will not rotate.

Figure 2:
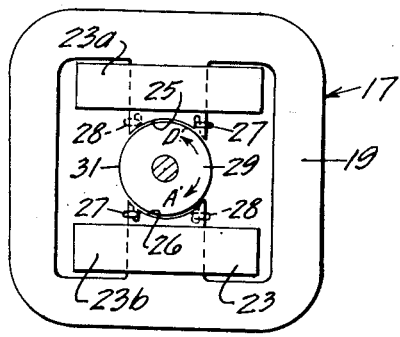
Fig. 2 is a detail vertical section view taken substantially at 2—2 of Fig. 1.
Figure 3:
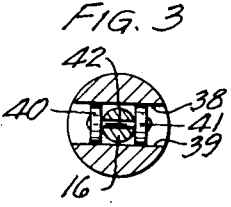
Fig. 3 is a detail vertical section view taken substantially at 3—3 of Fig. 1.

When a force is exerted in an axial direction such as in direction of arrow A on armatures 29 and 30 and shaft 16, due to the operation of gyro 53 resulting from the orientation thereof, or due to the pull of gravity if frame 10 is tilted to an inclined position, or due to the subjecting of the device to centrifugal or inertia forces, in an axial direction, shaft 16, armatures 29 and 30, the damping fans 47 and the bearing wheels 40 will all shift axially into a position such as dotted position B. When armature 29 is shifted into dotted position B, the area or portion of the peripheral surface 31 thereof which is in directly opposed relation with the pole face 25, is increased, and the air gap between armature 29 and pole face 25 remains substantially constant. The influence on armature 29 of the rotating magnetic field of field member 19 for developing torque therein is therefore increased because the area of overlap of armature 29 and field member 19 is increased. The torque developed in armature 29 and exerted thereby on shaft 16 is increased and will tend to turn shaft 16 in the direction of arrow A', as best shown in Fig. 2.

When armature 30 is shifted axially into dotted position B, the area of overlap thereof with respect to field member 20 is decreased, and the influence of the rotating magnetic field of field member 20 on armature 30 for developing torque therein is decreased. Therefore the torque developed in armature 30 is decreased. The air gap between armature 30 and the pole faces 26 of field member 20 remain substantially constant.

Because the torque exerted in the direction of arrow A' by armature 20 on shaft 16 is greater than the opposed torque developed in armature 30 and exerted on shaft 16, rotation of shaft 16 will result in the direction of arrow A'. Rotation is transmitted through the bearing wheels 40 and 41 to the bifurcated stud 37 and to the shaft 36. Rotation of shaft 36 is transmitted by the gear train 35 to spindle 34 and spindle 34 will do work such as the winding of cable onto drum 33. Rotation of spindle 34 also causes rotation of gears 33 and 34 and operation of rotary potentiometer 46.

In the form shown, rotation of shaft 16 in the direction of arrow A' due to axial displacement of the armatures 29 and 30 and shaft 16 in the direction of arrow A, will cause shifting of the central tap 46a of potentiometer 46 toward the dotted position X thereof. When the rotation of shaft 45 has shifted the center tap 46a into the dotted position X, the excitation of field coil 23 is decreased and the excitation of field coil 24 is increased to cause the respective fields thereof to be decreased and increased and the torque developed in the respective armatures 29 and 20 to be respectively decreased and increased. When the torques developed by armatures 29 have been changed sufficiently to come into balance, rotation of shaft 16 and of the center tap of the rotary potentiometer 46 will cease, and of course, the rotation of the spindle 34 and drum 33 will cease.

The force required to be exerted in an axial direction on armatures 29 and 30 and shaft 16 will be very small as compared to the magnitude of the torque developed by the motors 17 and 18 and transmitted to the shaft 34 for performing work. The small incremental shifting of the armatures 29 and 30 produces a very great increment of rotation of shaft 16, and of drum 33. There is a substantially straight line relation between the axially directed force exerted as by the gyro on the armatures 29 and 30 and the torque output of shaft 16 which is substantially equal to the differences between the torques exerted by armatures 29 and 30. There is also a substantially straight line relation between the incremental shifting in axial directions of the armatures 29 and 30 and the increments of rotation of shaft 16 and of the work drum 33. One of the most important factors in producing the straight line relation between the increments of axial displacement of the armatures and the increments of rotation thereof is the substantially constant air gap between the armatures and the field members.

When the armature 30 has shifted into dotted position B, the rotating field of field member 20 exerts an axially directed force thereon in the direction of arrow D tending to pull the armature 30 back into the full line position shown. Of course a similar axially directed force is being exerted by the rotating field of field member 19 on armature 29 in the direction of arrow A tending to maintain armature 29 in the dotted position B thereof. The force exerted by the rotating magnetic field on armature 30 is substantially greater than the force exerted on armature 29 by its corresponding rotating magnetic field because armature 30 is further out of alignment with its respective field member 20 than is armature 29 with respect to its field member 19. As a result there will be axial displacement of armatures 29 and 30 and shaft 16 in the direction of arrow D when the previously applied external force, exerted as by the gyro 53 in the direction of arrow A, is removed, and armatures 29 and 30 will shift back into their full line position shown in Fig. 1. One of the major factors tending to increase the centering force on armature 30 when the same has shitfed into dotted position B is the fact that the air gap between armature 30 and the pole faces 26 of field member 20 remains substantially constant. It should be noted that in the present form, the strength of the magnetic field produced in field member 20 is further increased by operation of potentiometer 46 to further increase the force exerted in the dierction of arrow D on armature 30 tending to pull the same back into the full line position shown in Fig. 1.

Figure 4:
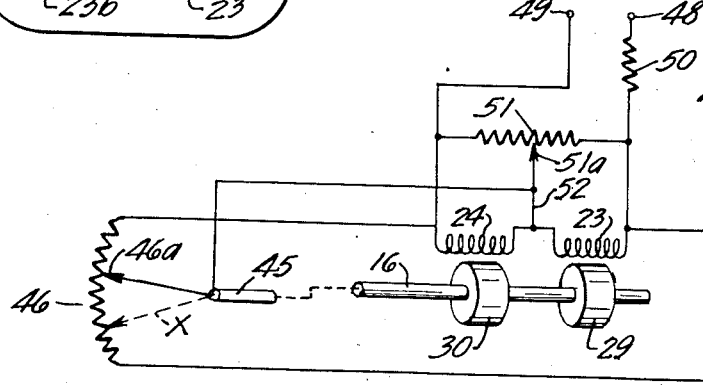
Fig. 4 is a schematic representation of the electrical circuit connected with the invention and showing diagrammatically portions of the structure.

When the external force applied to armatures 29 and 30 and shaft 16 tending to shift in the direction of arrow A and holding them in the dotted position B is removed, the armatures 29 and 30 will be shifted back into the full line position shown. In the form of the invention shown, the shifting of the armatures from their dotted position B to their full line position will cause the torque developed in armature 30 to be increased and will cause the torque developed in armature 29 to be decreased. Because the fields produced in field member 20 are stronger than the fields in field member 19, due to prvious operation of potentiometer 46, the torque developed in armature 30 will be greater than the torque developed in armature 29 and the shaft 16 will rotate in the direction of arrow D'. Such rotation of shaft 16 will cause adjustment of the potentiometer 46 back to the position shown in Fig. 4 to increase the strengths of the magnetic fields in field members 19 and 20.

When the armatures 29 and 30 and shaft 16 are shifted from the full line position shown to another axial position, the armatures 29 and 30 will rotate through a definite arc or increment of rotation from their starting position. When the axially directed force on shaft 16 and armatures 29 and 30 is removed, armatures 29 and 30 will be returned due to the influence of the respective fields to centered position shown in full lines and wherein the torques exerted on armatures 29 and 30 are normally substantially equal and balanced. Due to the operation of potentiometer 46 it unbalances the excitation of field coils 23 and 24, the armatures 29 and 30 and shaft 16 will return through reverse rotation to their rotational starting positions. The arc of rotation of the armatures due to axial shifting thereof out of full line position shown is substantially equal to the arc through which the armatures rotate when they are returned from their axially shifted position to the full line position shown.

Of course the gyro 53 may shift the armatures 29 and 30 and shaft 16 in the direction of arrow D and the drum 33 and the center tap 46a of potentiometer 46 will turn in the opposite direction than that previously turned. The operation of the transducer will be susbtantially the same as hereinbefore described.

The fan or propeller 47 is effective to damp the rotation of shaft 16 and armatures 29 and 30 so as to restrict undesired rotary oscillation thereof. Fan 47 also restricts reciprocal oscillation in an axial direction on the shaft 16 and armatures 29 and 30. Fan 47 will thereby tend to smooth out the operation of the transducer preventing the armatures and shaft 16 from rotating beyond the desired increment of rotation and for stopping the same when they are returned to their centered positions.

Operation of the rotary potentiometer 51 such as by manual means will cause unbalancing of the excitations of field coils 23 and 24 which cause unbalance of the torques exerted by armatures 29 and 30 on shaft 16 and results in rotation of shaft 16 in one direction or the other dependent upon the direction in which the center tap 51a is shifted. The rotary power output of the transducer may thereby be controlled by hand as well as by automatic means.

It will be seen that I have provided a new and improved transducer having relatively shiftable armature means and field producing means to permit the same when shifted relative to each other to vary the torque output therefrom in a definite relation to the magnitude of shifting thereof.

It should also be apparent that I have provided a new and improved transducer including a pair of interconnected electric motors arranged to exert opposed torques on a driven rotary shaft, which torques may be unbalanced to produce rotation when the rotors and stators are axially shifted relative to each other and also arranged to continuously urge the stators and rotors relative to each other into centered position to substantially balance the torque outputs of the separate motors and thereby cease the rotation of the driven shaft.

It will also be apparent that I have provided a transducer including a pair of interconnected electric motors arranged to produce a highly amplified torque output in response to a small force input and to produce as a result of axial displacement of the rotors with respect to the stators, a predetermined incremental rotation of the stators and power output shaft, which rotation has a definite relation to the increment of axial shifting of the armatures.

What is claimed is:

1. A transducer comprising field producing means, armature means mounted concentrically of said field producing means, one within the other and in axially overlapped relation one to the other, circuit meanse effecting a pair of balanced torque-producing fields in said field producing means for influencing said armature means and producing a pair of torques between said armature means and said field producing means, said torques opposing each other, said armature means and said field producing means being so mounted as to permit relative shifting of one relative to the other to vary the relative influences of said fields and to thereby vary said torques relative to each other for producing relative rotation between said field producing means and said armature means, whereby said balanced fields will urge said armature means and said field producing means with respect to each other, into positions of substantially equal torque-producing influences of said fields.

2. A transducer comprising field producing means, circuit means effecting a pair of torque-producing fields in said field producing means, armature means mounted to be influenced by said field for developing torques with respect to said field producing means, said armature means and said field producing means being constructed and arranged to cause the respective torques produced by said fields to oppose each other, said field producing means and said armature means being mounted for relative rotation and for shifting of one relative to the other to vary the relative influences of said fields on said armature means and to thereby balance said torques in one position and to unbalance said torques in other positions for producing relative rotation between said armature means and said field producing means, said armature means and said field producing means being constructed and arranged to be urged by said fields to positions of substantially equal torque-producing influences of said fields, and control means for rebalancing said opposed torques and thereby limiting the relatiive rotation between said armature means and said field producing means to predetermined increments.

3. The invention set forth in claim 2 wherein said control means is responsive to incremental relative rotation between said armature means and said field producing means for rebalancing said opposed torques and thereby limiting the relative rotation thereof to predetermined rotational increments with incremental shifting of one relative to the other.

4. A transducer comprising field producing means, armature means mounted to be influenced by the fields of said field producing means for developing torque with respect thereto, a rotary driven member, one of said two means being mounted for rotation with respect to the other of said means and being driveably connected with said driven member for exerting torque thereon, circuit means connected with said field producing means for effecting a pair of torque-producing fields therein, said field producing means and said armature means being relatively shiftable for varying the relative torque-producing influences of said rotating fields on said armature means for rotating said driven member, said field producing means and said armature means being constructed and arranged for directing the separate torques developed by said separate fields in opposed directions and said armature means and said field producing means being constructed and arranged to be continuously urged into position of substantially equal torque-producing influences of said fields, said circuit means including a control connected with said driven member for operation thereby and for varying the relative strengths of said fields and re-balancing said torques to produce incremental relative rotation of said armature means and said field producing means with predetermined incremental relative shifting thereof.

5. A transducer comprising field producing means, circuit means effecting a pair of torque producing fields in said field producing means, armature means mounted to be influenced by said fields for developing torques with respect to said field producing means, said armature means and said field producing fields being constructed and arranged to cause the respective torques produced by said fields to oppose each other, said field producing means and said armature means being mounted for relative rotation and for shifting of one relative to the other to vary the relative influence of said fields on said armature means and to thereby unbalance said opposed torques for producing relative rotation between said armature means and said field producing means, said armature means and said field producing fields being constructed and arranged to be urged by said fields into positions of substantially equal torque-producing influences of said fields, and damping means restricting relative rotation of said armature means and said field producing means, said damping means also restricting relative shifting between said armature means and said field producing means, whereby when relative force is applied between said armature means and said field producing means to shift one relative to the other, positive relative rotation thereof will result and undesired rotary oscillation and oscillatory shifting of said field producing means and said field producing means is restricted.

6. The structure recited in claim 5 wherein said damping means includes a propeller having blades formed with a pitch so as to restrict both rotation and axial shifting thereof, and said propeller being connected for rotation with said relatively rotatable armature means and field producing means.

References Cited in the file of this patent

UNITED STATES PATENTS

| 2,066,760 | Blamberg | Jan. 5, 1937 |
| 2,475,119 | Wray | July 5, 1949 |
| 2,567,202 | Goertz | Sept. 11, 1951 |
| 2,586,034 | Halpert | Feb. 19, 1952 |

FOREIGN PATENTS

| 682,467 | Germany | Oct. 14, 1939 |